United States Patent [19]

Wheeler

[11] Patent Number: 5,189,467
[45] Date of Patent: Feb. 23, 1993

[54] METHOD OF COMBINING GRAPHICS AND PHOTOGRAPHY TO PROVIDE A PROGRAM TO CREATE SELF-ESTEEM IN CHILDREN

[76] Inventor: Alton D. Wheeler, 3940 Fox Meadow La., Pasadena, Tex. 77504

[21] Appl. No.: 722,187

[22] Filed: Jun. 27, 1991

[51] Int. Cl.$^5$ .................................................. G03B 35/00
[52] U.S. Cl. ........................................ 354/110; 354/295
[58] Field of Search .............. 354/110, 120, 125, 295, 354/296, 145.1, 149.11, 108

[56] References Cited

U.S. PATENT DOCUMENTS

| | | | |
|---|---|---|---|
| H654 | 7/1989 | Doyle, Jr. et al. | 354/296 |
| 4,268,144 | 5/1981 | Wheeler | 354/108 |
| 4,478,501 | 10/1984 | Klancaaik | 354/125 |
| 4,708,449 | 11/1987 | Thomas | 354/122 |
| 4,717,930 | 1/1988 | Wheeler | 354/108 |
| 4,764,782 | 8/1988 | Wheeler | 354/109 |
| 4,816,848 | 3/1989 | Doyle, Jr. | 354/108 |
| 4,827,291 | 5/1989 | Guez | 354/125 |
| 4,894,671 | 1/1990 | Wheeler | 354/108 |
| 4,942,412 | 7/1990 | Wheeler | 354/125 |
| 4,994,832 | 2/1991 | Spector | 354/108 |
| 5,038,161 | 8/1991 | Ki | 354/125 |

Primary Examiner—Michael L. Gellner
Assistant Examiner—David M. Gray
Attorney, Agent, or Firm—William W. Haefliger

[57] ABSTRACT

The method of producing multiple images on a light sensitive photographic film, the steps include providing a photographic film having thereon a pre-exposed image A which is undeveloped; providing a template having i) a mask section A' positioned to mask the image A when the template is aligned in superposed relation over the film, and
ii) a transparent section with a graphics image B thereon to be reproduced on the film, aligning the template in superposed relation over the film; and passing light through the transparent section of the template to reproduce a version of the image B on the undeveloped film, light also being blocked by the mask section of the template; and developing the film to convert the images A and B thereon into developed visible images.

32 Claims, 5 Drawing Sheets

METHOD OF COMBINING GRAPHICS AND PHOTOGRAPHY TO PROVIDE A PROGRAM TO CREATE SELF-ESTEEM IN CHILDREN

BACKGROUND OF THE INVENTION

This invention relates generally to photography, and more particularly concerns the reproducing of selected images within a camera on film being exposed to light coming from sources outside a camera. The invention relates to and improves upon the disclosures of U.S. Pat. No. 4,268,144 and U.S. Pat. No. 4,717,930. The latter are incorporated herein by reference.

There is a perceived need for method and means to permit a photograph to "label" films with selected images in addition to those resulting from entrance of external light into a camera. Thus, for example, it is of great commercial advantage to form an image or service mark of a business onto films exposed to light coming from an object or building associated with that business, all at the time of exposure of the film. Many other examples of such need for film labeling exist. There is also a need to provide a light modulated background for such. However, no prior device embodying the unusual advantages of the herein described device, meeting such needs has existed to applicant's knowledge.

SUMMARY OF THE INVENTION

It is a major object of the invention to provide a method of photography employing time differentially exposed multiple images on a single film sheet, examples being a pre-exposed image on the sheet together with later-produced images on the sheet, such as object and/or graphics images. The pre-exposed image may itself be a graphics image.

The basic method of the invention includes the steps:
a) providing a photographic film having thereon a pre-exposed image A which is undeveloped,
b) providing a template having
i) a mask section A' positioned to mask the image A when the template is aligned in superposed relation over the film, and
ii) a transparent section with a graphics image B thereon to be reproduced on the film,
c) aligning the template in superposed relation over the film, and
d) passing light through the transparent section of the template to reproduce a version of the image B as a negative image on the undeveloped film, light also being blocked by the mask section of the template,
e) and developing the film to convert the images A and B thereon into developed visible images.

As will be seen, step e) may include relatively removing the film out of superposed relation with the mask; and the film itself may be of quick-developing POLAROID type.

Another object includes providing a stack of films with the pre-exposed image A on each of the films, the negative images A being in alignment with the mask section A' of the template, and repeating step d) to pass light to each of the films, in succession.

A further object includes the provision of apparatus for performing the above method or methods.

These and other objects and advantages of the invention, as well as the details of an illustrative embodiment, will be more fully understood from the following specification and drawings in which:

DETAILED DESCRIPTION

Figure 9:
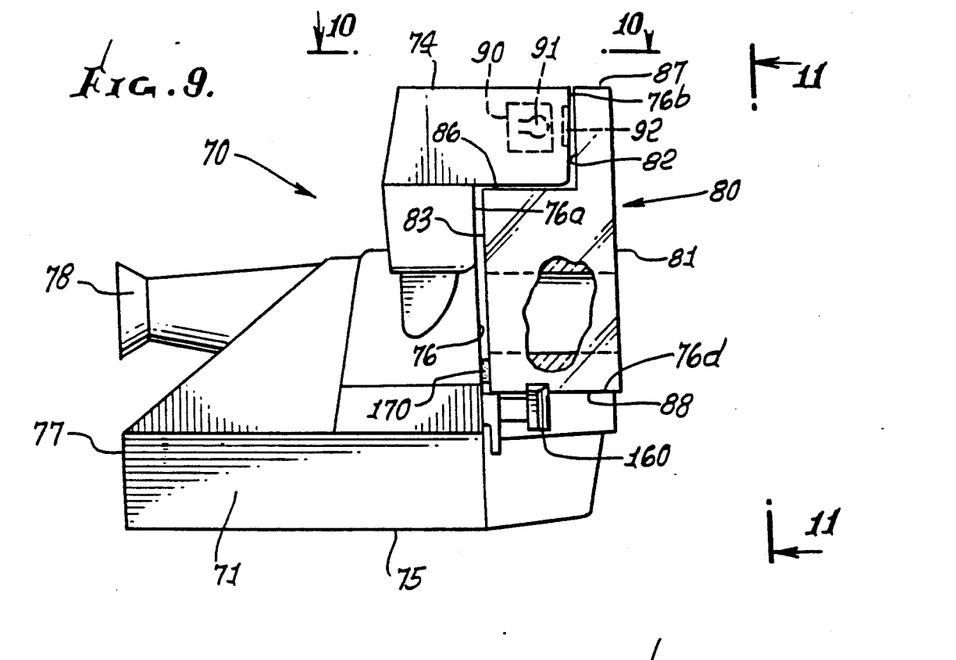
FIG. 9 is a side elevation or view of a camera incorporating the invention.
Figure 10:
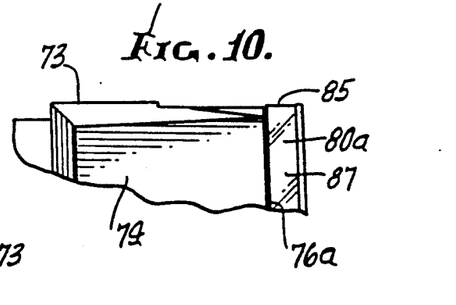
FIG. 10 is a fragmentary top plan view of a portion of the FIG. 9 camera, and taken on lines 10—10 of FIG. 9.
Figure 11:
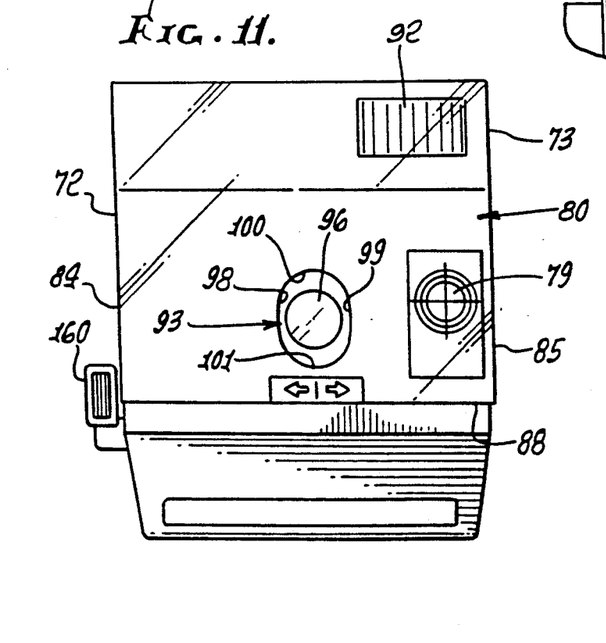
FIG. 11 is a frontal elevation on lines 11—11 of FIG. 9.

Referring first to FIGS. 9–11, a camera 70 includes a housing 71 having opposite sides 72 and 73, top 74, bottom 75, front wall 76, and rear wall 77. An eyepiece housing for viewing a target is shown at 78, the corresponding window in the front wall of the housing indicated at 79. The latter is seen in FIG. 11 through a transparent body or block overlying the window at the front thereof. That body also may extend across the length and width of the front of the camera housing, about level 88. Body 80 has a front wall 81, rear walls 82 and 83, opposite side walls 84 and 85, top walls 86 and 87, and bottom wall 88. Accordingly, it closely fits the space defined by housing front wall sections 76a (facing body upright wall 83), 76b (facing upright body wall 82), 76c (facing body horizontal wall 86), and 76d (facing body horizontal wall 88). The body 80 may consist of clear transparent plastic material, such as LUCITE, and be positioned by camera housing walls or structure, at the front of the camera, for purposes to be described. A POLAROID camera is one example.

The camera also includes a means for producing a light flash to illuminate the object 93 whose photograph is being taken. Such a means is indicated at 90 in FIG. 9, and may include a flash bulb 91, also seen in FIG. 12. A transparent window 92 in the camera front wall 76b passes the generated light forwardly. See also trigger 160.

Figure 12:
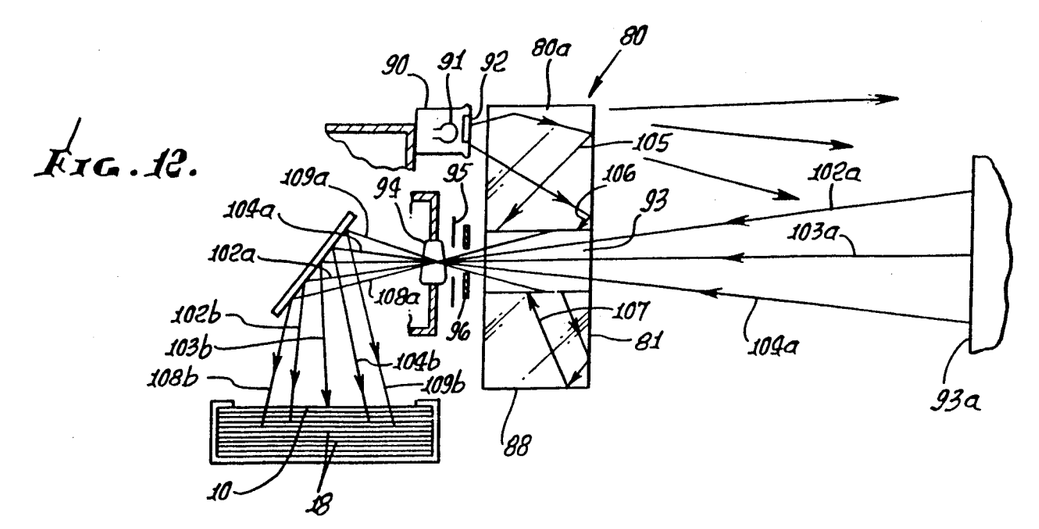
FIG. 12 is a schematic view of optical components.

Means such as block 80 is provided for channeling at least some of the light produced by the flash to a zone proximate the camera lens and extending about the direct path of light that travels from the object through the lens, to the film in the camera. That zone is generally tubular, and is indicated at 93 forward of lens 94, shutter 95, and front window 96. More specifically, the zone 93 is generally elliptical, having forwardly extending elliptical walls 98–101 formed by the block 80, those walls being roughened to diffuse light transmitted within the block and toward zone 93, impinging on such walls. Such light is transmitted from the flash bulb 91 through window 92 and into the upper extent 80a of the block 80, some of the light being reflected off the walls 81, 84, 85, and 88 toward zone 93 where it impinges on the walls 98–101. The remainder of the light from the flash passes through the block and to the object 93a, illuminating same at the time of film exposure, as by opening of shutter 95.

The direct path of light traveling from the object 93 to and through the lens (to the film 18 in the film pack) is indicated by rays 102a and 102b, 103a and 103b, and 104a and 104b, a mirror reflecting rays 102a, 103a and 104a toward the film as rays 102b, 103b, and 104b. Light channeled to zone 93 via the block 80 (see rays 105, 106 and 107, for example) illuminates diffusing walls 96–101, which may be roughened for enhanced illumination. Such illumination also passes through the lens (see rays 108a and 108b, and 109a and 109b, for example) and operates to locally illuminate the film forming a light modulated background to the image of the object and to the image of reproduced graphics, as will be referred to. The graphics template overlying the film 18 in the film pack is indicated at 10.

Further, it will be observed that the elliptical or tubular bore defined by the walls of zone 93 has an axis generally coincident with an axis 111 defined by the camera lens, and extending forwardly.

Figure 13:
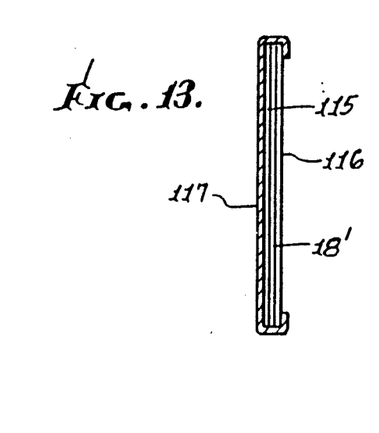
FIG. 13 shows a print in a backer.

The resultant film, when developed and displayed as a print 18' in FIG. 13, portrays a light modulated, i.e., white or near white, background on which a clear image of the object appears along with a clear image of graphics affixed to the template 10. For example, the template graphics may consist of an event representation (year, title, etc.) portrayed on the print; the portrayed object may be in the form of a portrait of a person; and these elements are on a white background obtained by the us of the channeled light from the flash.

In FIG. 13, the print is mounted on a backer 115, its front is covered by a transparent sheet or disc 116, and flat receptacle 117 retains the elements in stacked relation.

Figure 14:
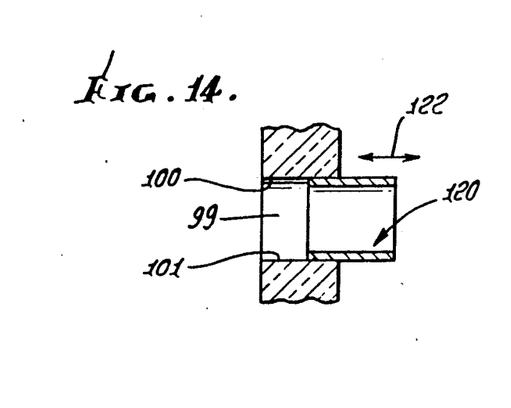
FIG. 14 shows a shiftable mask.

FIG. 14 shows a means, such as a shiftable mask 120, to control the amount of light transmitted via walls 98–101 to the film. Mask 120 comprises a thin walled loop fitting the walls 98–101 and slidable forwardly and rearwardly (see arrow 122) to variably cover the walls. Mask 120 may be transparent and colored, such as blue or green, to add coloring to the background produced on the film.

The block walls may carry reflecting material to reflect the rays in the block. Block mounting adhesive is shown at 170, for example.

Figure 1:
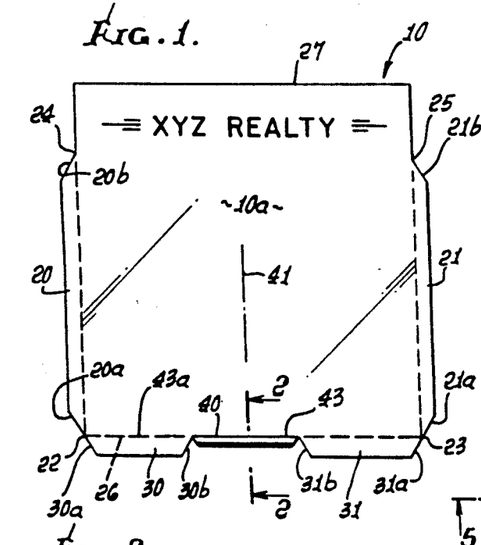
FIG. 1 is a plan view of a transparent template embodying the invention.
Figure 2:
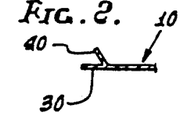
FIG. 2 is a section on lines 2—2 of FIG. 1.

Referring now to FIG. 1, device 10 comprises a template adapted for use in conjunction with exposure of photographic film carried by structure that includes a frame. One such frame appears at 100 in FIGS. 6–8, and includes side walls 11 and 12, front and rear walls 13 and 14, a top cover having portions 15a–15d bordering an opening 16, and a bottom cover 17. That frame may consist of lightweight plastic material, as for example is exemplified by the POLAROID SX-70 LAND FILM frame for a film pack, as is seen in 18 in FIGS. 7 and 8. The top portion 14b of wall 14 is removable to allow pull-out removal of film in use.

Referring back to FIG. 1, the template is in the form of a transparent, generally planar and rectangular plastic sheet adapted to cause an image to be reproduced on successive film sheets 18. Merely as illustrative, the template is shown to carry the image "XYZ REALTY", as in the form of heavy dark lines and that image is successively reproduced on each sheet of film 18 as that sheet is exposed to light passing through the template and onto the film, as the camera (into which the film pack is inserted) is operated.

The template, which may consist of polyethylene about 0.005 inches thick, for example, has retainer tabs projecting at multiple edge portions of the sheet to removably fit beneath two or more of the frame border portions 15a–15d, thereby to removably retain the template to the frame structure so that the main central extent 10a of the template overlies the stack of film sheets 18 in the pack carried by the frame. More specifically, the multiple tabs include two longitudinally elongated, like, relatively narrow, parallel tabs 20 and 21 projecting oppositely at opposite sides of the template. Those tabs extend from locations 22 and 23 adjacent one end 26 of the template toward the opposite end 27 of the latter, but terminate at locations 24 and 25 in spaced relation to that opposite end of the template. Tabs 20 and 21 have tapered end terminals 20a and 20b, and 21a and 21b, whereby the tabs have trapezoidal shape. The tab widths are desirably each about 0.14 inch.

Figures 5, 6, 7, 8:
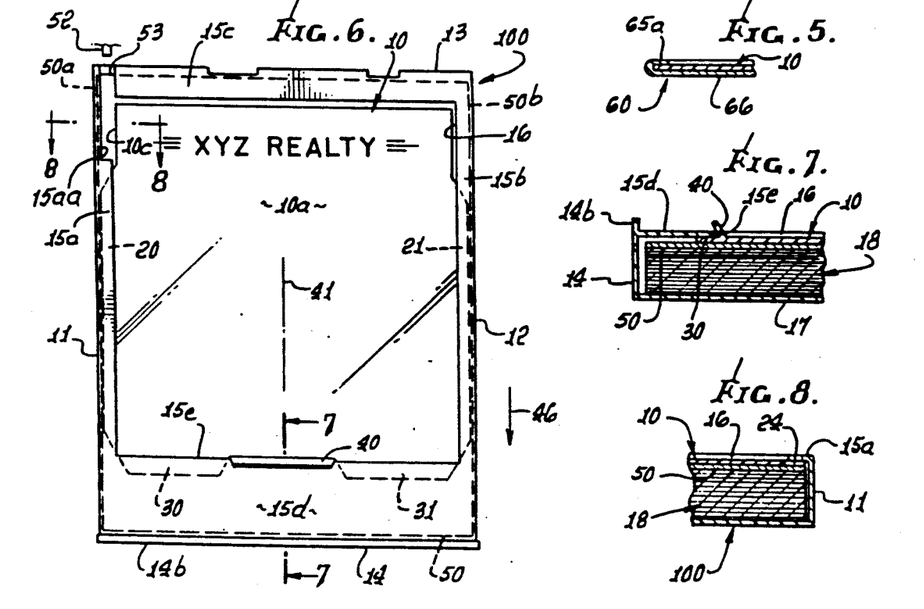
FIG. 5 is a section taken on lines 5—5 of FIG. 3.
FIG. 6 is a plan view of a frame for a film pack, with the FIG. 1 template carried by the frame.
FIG. 7 is an enlarged section on lines 7—7 of FIG. 6.
FIG. 8 is an enlarged section on lines 8—8 of FIG. 6.

Further, the multiple tabs also include two laterally elongated tabs 30 and 31 at said one end 26 of the template, the tabs 30 and 31 being in lateral alignment, spaced apart and in the plane of the template. They have tapered terminals 30a, 30b, 31a and 31b, and terminals 30a and 20a are typically in alignment as are terminals 31a and 21a. Thus, tabs 30 and 31 are also trapezoidal in outline. The number of exposed, sharply pointed corners is thereby reduced, aiding insertion of the tabs beneath frame structure, as seen in FIG. 6. The width of each tab 30 and 31 is approximately 0.20 inch.

The limit tab 40 is generally located between tabs 30 and 31, to extend in alignment with the longitudinally extending central axis 40 of the template, thereby to centrally receive force resulting from engagement with edge 15b of frame cover portion 15a (see FIG. 7). Note that the width of the limit tab is considerably less than the widths of tabs 30 and 31, so as not to project materially above the top plane of the pack from 100 (i.e., so as not to interfere with insertion of the frame into the camera). Thus, the width of tab 40 is typically about 0.075 inch. It joins the template along a lateral hinge line 43 which is in generally endwise alignment with the line 43a of juncture of the tabs 30 and 31 with the template. In this regard, all tabs and the template may consist or be formed of the same transparent plastic material.

In FIG. 6, the tabs 20 and 21 removably fit beneath frame cover portions 15a and 15b, and extend to frame walls 11 and 12 to centrally position the template in the frame, i.e., against appreciable lateral movement. Also, tabs 30 and 31 removably fit beneath frame cover portion 15d, whereas limit tab 40 projects upwardly to flatly engage edge 15e, as referred to, blocking movement of the template in the direction of arrow 46 (the direction of film withdrawal from the pack or frame).

Thus, the template remains in the frame, while successive film sheets are withdrawn, so that each time a film sheet is exposed, the image on the template is reproduced on the film exposed. The template may be removed from the pack or frame for later use with another frame.

A protective cardboard sheet 50 is shown overlying the top of the film pack and underlying the template. The longitudinal edges 50a and 50b of the sheet 50 also underlie frame cover portions 15a and 15b. As the pack is inserted into a camera, a pusher 52 in the camera pushes against edge 53 of the cardboard to push it out of the pack in the direction of arrow 46. Since template 10 is relieved at 10c, it is not engaged by the pusher 52. Note that template tab 20 is not exposed at the cut-away section 15aa of the cover portion 15a, but remains beneath portion 15a.

Figure 3:
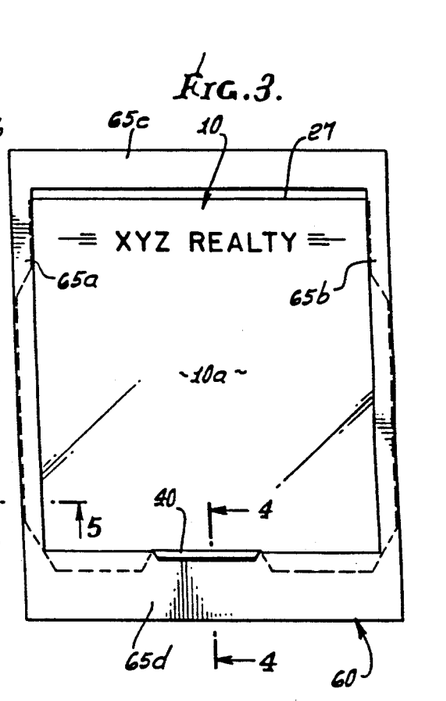
FIG. 3 is a plan view of the FIG. 1 template on a carrier that simulates a film pack frame.
Figure 4:
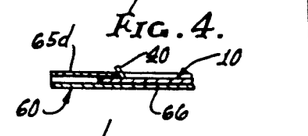
FIG. 4 is a section taken on lines 4—4 of FIG. 3.

FIGS. 3-5 show a cardboard holder 60 which interfits the template and tabs in the same manner as frame 100, for instructional purposes. Thus, the template purchaser sees how the template interfits its holder 60 at the time of purchase, and he can then easily remove it from the holder and attach it to film pack. Elements 65a-65d correspond to elements 15a-15d. The bottom of the holder appears at 66. FIGS. 1-8 are also described in U.S. Pat. No. 4,268,144.

Figure 15:
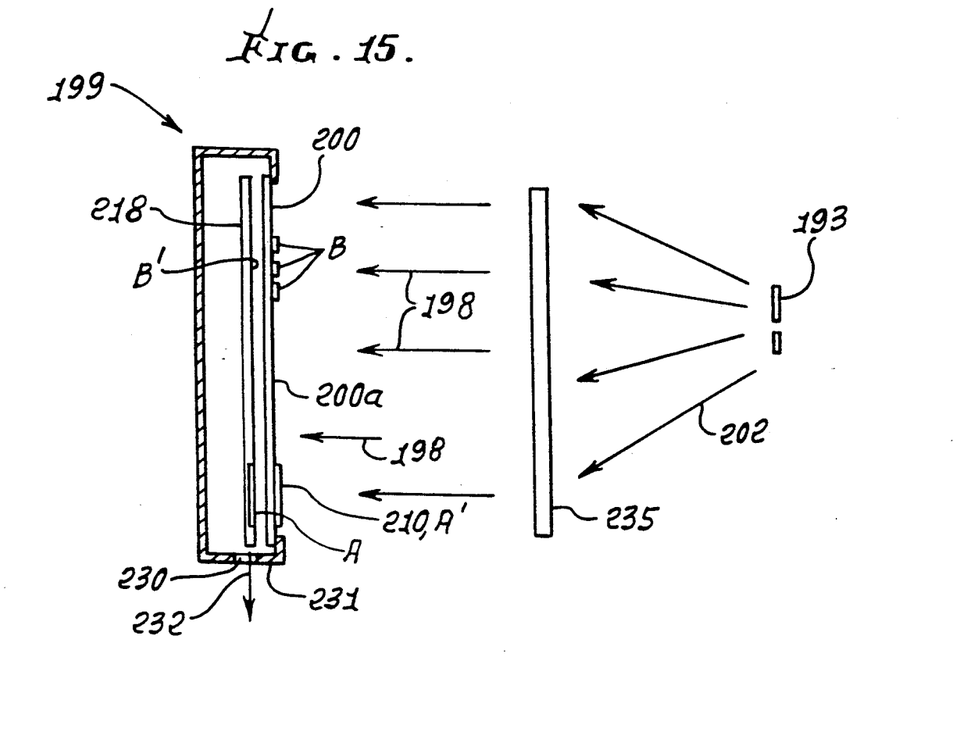
FIG. 15 is a system diagram.

Referring now to FIG. 15, a photographic film or film sheet is shown at 218, within a frame 199 (corresponding to frame 100 in FIG. 8). Also located within the frame is a template sheet 200 in alignment or registration with the film, in light impingement direction 198. Light from a source, such as an object 193 being photographed, travels at 202 and at 203 in direction 198, to impinge on the template 200.

Figure 16:
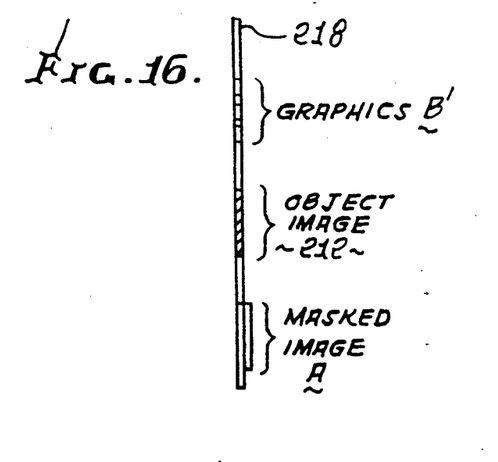
FIG. 16 is an edge view of a film sheet on which three images have been formed, at least two being differentially time-wise exposed images.

The film sheet has thereon a pre-exposed (negative) image A, as in a local layer parallel with the film sheet, that image typically not being developed. It may correspond to POLAROID film which has been previously, briefly exposed to a light flash from the object. See for example the manner described above in FIG. 12. The template 200 carries or includes a light mask 210 in registration with the image A to prevent impinging of light rays 203 on the image A, the latter being unrelated (or related) to the object 193. Light rays 203 not falling upon the mask pass through the transparent extent 200a of the template and impinge on the surface emulsion of the film to expose that emulsion for image reproduction of the object 193. See FIG. 16 showing the film sheet with the object image exposure zone 212 on the sheet 218, offset from the pre-exposed image A, masked by 210.

In addition, and if desired, the template may carry selected graphics B (corresponding for example to the XYZ graphics in FIGS. 1, 3, and 6). That graphics may be in the form of alphanumeric characters, or have other form, and may consist of an opaque or darkened zone or zones on the template, so that light falling upon the graphics does not pass through it, and an image corresponding to the graphics is reproduced on the film sheet, at B', as the light 203 otherwise passes through the template and onto the film. After removal of the film 218 from the pack or frame, as via side opening 230 in wall 231 (see arrow 232), the film can be developed as by further exposure to light, an example being the POLAROID process, to achieve a print. Three images will then appear: the image A, the graphics image B, and the image of object 193.

In FIG. 15, numeral 235 schematically indicates a means to controllably pass light to the template, as for example flash timing means, light collection means, etc. See for example FIG. 12, other apparatus being usable.

Figure 17:
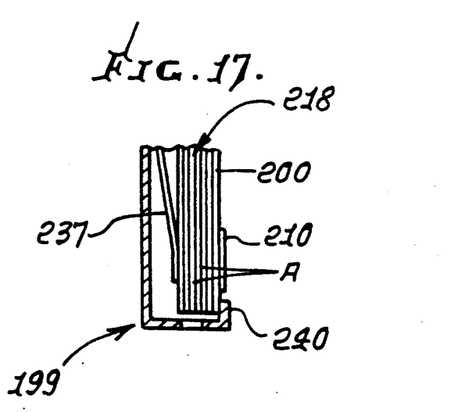
FIG. 17 is a fragmentary view showing a stack of films to be exposed.

FIG. 17 is similar to FIG. 15 except a stack of film sheets 218 is shown, urged by spring 237 toward the template 250. All or some of the sheets 218 have pre-exposed zones A, as seen in FIG. 15, in alignment with the template mask 210. The template is edge-retained by the frame, as at 240.

Figure 18:
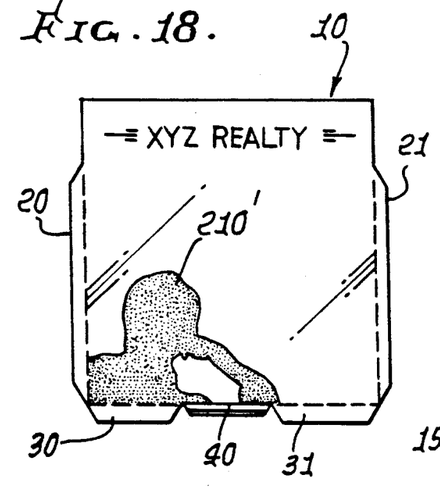
FIGS. 18 and 19 correspond to FIGS. 1 and 6 and show incorporation of principles of FIGS. 15 and 16.
Figure 19:
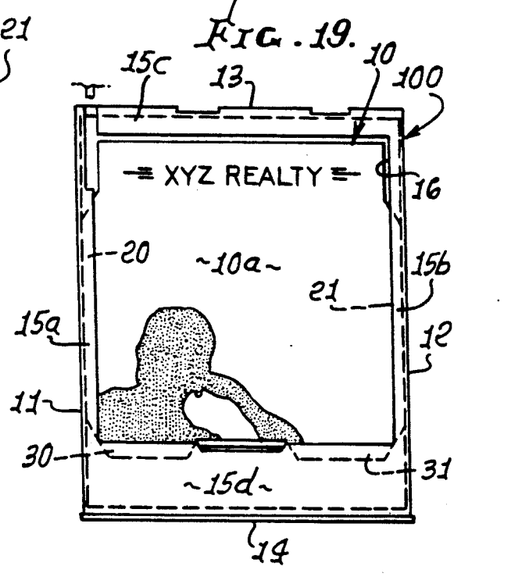
Figure 20:
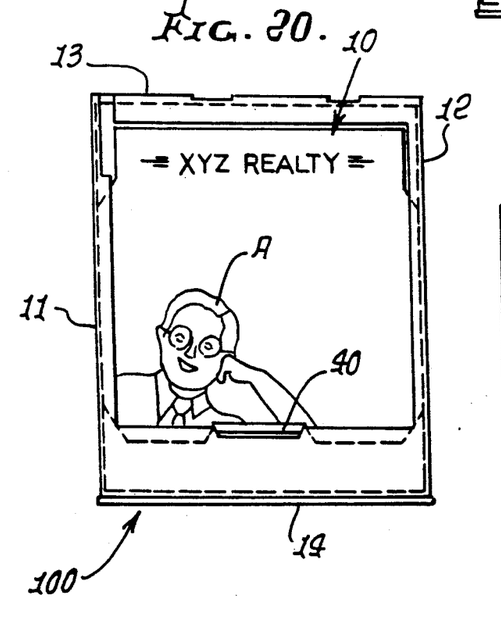
FIG. 20 shows a film sheet having a pre-exposed image thereon.
Figure 21:
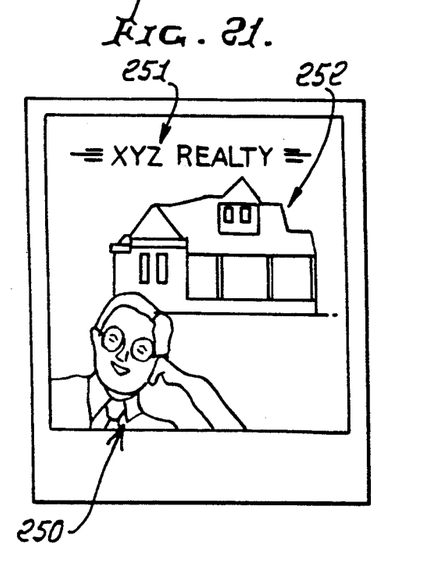
FIG. 21 shows film sheet after three images have been formed and developed.

FIGS. 18 and 19 are similar to FIGS. 1, 3 and 6, and show incorporation of the principals of FIGS. 15 and 16. The template 10 carries a mask 210' (corresponding to mask 210) in the form of the head and shoulders of a man. It marks the pre-exposed, undeveloped and corresponding image A on a film sheet 18 retained in a pack, as discussed above in FIGS. 1, 3 and 6-8, that film sheet being seen in FIG. 20. Graphics on the transparent plastic template (and corresponding to graphics B above) take the form of "XYZ REALTY". After in-camera exposure of the film to light from a object (as for example a building), removal of the film from the pack and camera, and development (as for example by a POLAROID process to quickly produce a print), the resultant developed film sheet appears, as in FIG. 21, on which all three images are seen (the man's image 250, the graphics image 251, and the object image 252).

I claim:

1. In the method of producing multiple images on a light sensitive photographic film, the steps including
    a) providing a photographic film having thereon a pre-exposed image A which is undeveloped,
    b) providing a single template having
        i) a mask section A' positioned to mask said image A when the template is aligned in superposed relation over the film, and
        ii) a transparent section with a graphics image B thereon to be reproduced on the film,
        iii) said template provided to offset said section A' from said image B at different locations on the same template,
    c) aligning the template in superposed relation over the film, and
    d) passing light through said transparent section of the template to reproduce a version of said image B on the undeveloped film, light also being simultaneously blocked by the mask section of the template,
    e) and developing said film to convert said images A and B thereon into developed visible images.

2. The method of claim 1 wherein said step e) includes relatively removing the film out of superposed relation with the mask.

3. The method of claim 2 wherein said film is a quick-developing film of POLAROID type.

4. The method of claim 1 including positioning the film in face-to-face relation with the template so that said masked section A' of the template masks light transmission to said pre-exposed image A on the film.

5. The method of claim 1 including providing a stack of said films with said pre-exposed image A on each of the films, said negative image A being in alignment with the mask section A' of the template, and repeating said step d) to pass light to each of the films, in succession.

6. The method of claim 5 including removing each of the films from the stack after light has been passed to said film.

7. The method of claim 6 wherein each of the films is of POLAROID type.

8. In the method of producing multiple images on a light sensitive photographic film, the steps including
   a) providing a photographic film having thereon a pre-exposed negative image A which is undeveloped,
   b) providing a single template having
      i) a mask section A' positioned to mask said image A when the template is aligned in superposed relation over the film, and
      ii) a transparent section to pass light from an object to be photographed, there being a graphics image B on the template,
      iii) said template provided to offset said section A' from said image B at different locations on the same template,
   c) aligning the template in superposed relation over the film, and
   d) passing object light onto the template to pass said object light through said transparent section of the template and onto the film to create an undeveloped image of the object on the film, and also to cause simultaneous blockage of light transmission at the mask section A', as well as image B reproduction on the film,
   e) and displacing said film from alignment with the mask and causing the film to be developed to convert undeveloped image A into a visible image, and also to convert said undeveloped image of the object on the film into a visible image, and to connect the reproduced image B into a visible image.

9. The method of claim 8 wherein the film is a quick-developing film of POLAROID type.

10. The method of claim 8 wherein the template has a graphics image B therein to be reproduced on the film, and wherein said light passed to the template causes production of a version of said image B as on the undeveloped film, to be subsequently developed into a visible image during performance of said step e) of claim 8.

11. In apparatus for producing multiple images on a light sensitive photographic film, the combination comprising
   a) a photographic film having thereon a pre-exposed image A which is undeveloped,
   b) a single template having
      i) a mask section A' positioned to mask said image A when the template is aligned in superposed relation over the film, and
      ii) a transparent section with a graphics image B thereon to be reproduced on the film,
      iii) said section A' being offset from said image B at different locations on the same template,
   c) the template aligned in superposed relation over the film, and
   d) means for passing light through said transparent section of the template to reproduce a version of said image B on the undeveloped film, light also being blocked by the mask section of the template,
   e) whereby said film may be developed to convert said images A and B thereon into developed visible images.

12. In the method of instant photography wherein graphics associated with a single template are to be reproduced on a photographic print along with the image of an object whose photograph is taken using a camera, the improvement comprising the steps
   a) producing a light flash,
   b) and channeling at least some of the light to a zone proximate the camera lens and defining a light diffusing wall extending about an open space forming the direct path of light that travels from said object through said lens to film in the camera,
   c) whereby light channeled to said zone and through said wall also passes through the lens and operates to illuminate the film forming a light modulated background to the image of said object and also to said reproduced graphics,
   d) locating the template to pass said light channeled through said diffusing wall,
   e) and masking at least some of the light impinging on the template to prevent further exposure of a pre-exposed section of the film,
   f) said template provided to have
      i) a mask section A' positioned to mask said image A when the template is aligned in superposed relation over the film, and
      ii) a transparent section with a graphics image B thereon to be reproduced on the film,
      iii) said template provided to offset said section A' from said image B at different locations on the same template.

13. The method of claim 12 wherein said zone is tubular and light at said zone is diffused.

14. The method of claim 12 wherein the light flash is produced in conjunction with opening of the camera shutter.

15. The method of claim 14 wherein the light from said flash is channeled via a transparent body at the front of the camera, the body having edges, and including reflecting light traveling in said body from certain edges and toward said zone.

16. The method of claim 15 including extending said body into the path of light traveling from a flash bulb carried by the camera.

17. The method of claim 12 including providing a print holder having front and back components, placing the print between said components so that said image, graphics and background are visible at one side of the holder.

18. The method of claim 15 including attaching said transparent body to the camera prior to said flash production.

19. The method of claim 12 including variably controlling the amount of light transmitted from walls of said zone to the lens.

20. Apparatus for use in the method of instant photography wherein graphics are reproduced on a photographic print along with the image of an object when the photograph is taken using a camera having means for producing a light flash, comprising
   a) means for channeling at least some of the light to a zone proximate the front of the camera lens and defining a light channeling wall extending about an open space forming the direct path of light that travels from said object through said lens to film in the camera,
   b) and structure positioning said means at the front of the camera, and
   c) said graphics located on a single template which is positioned to pass light that has passed through said lens,
   d) the template including a light mask,
   e) said graphics being offset from said light mask, at a different location on the same template, f) the template including a light passing transparent section offset from said mask and said graphics.

21. The apparatus of claim 20 wherein said zone is generally tubular, and light at said zone is diffused.

22. The apparatus of claim 20 wherein said zone is generally elliptical, and has forwardly extending elliptical walls, the body consisting of clear plastic material, the walls being roughened, said zone adapted to pass light rays from said object in a rearward direction along optical path toward the lens.

23. The apparatus of claim 20 wherein said light channeling means extends into proximity to the flash producing means and to said zone, and at the front of the camera, whereby light from said flash is channeled to said zone in conjunction with opening of the camera shutter, the template located at a film pack in the camera.

24. The apparatus of claim 23 wherein said light channeling means comprises a transparent body having light reflecting planar surfaces spaced about said zone for reflecting light traveling in said body toward said zone.

25. The apparatus of claim 24 wherein said body has a bore defining said zone, said bore being roughened to diffuse light.

26. The apparatus of claim 25 wherein said bore has an axis generally coincident with an axis defined by the camera lens.

27. Apparatus for use in the method of instant photography wherein graphics are reproduced on a photographic print along with the image of an object when the photograph is taken using a camera, comprising a) means for effecting light transmission to a zone defining a light channeling wall extending about the direct path of light that travels from said object, via a lens, to film in the camera,
b) said means associated with the camera, and located outside said direct path of the light,
c) said graphics located on a template which is positioned to pass light channeled by said wall,
d) and including said template which carries a mask for masking transmission of a portion of said light to a pre-exposed section of said film,
e) said mask offset from said graphics on the same template, the template including a light-transmitting section offset from the mask and graphics.

28. The apparatus of claim 27 wherein said means includes at least one light-reflecting surface.

29. The apparatus of claim 27 wherein the camera incorporates an electrically energized light source, and said means is in the path of light transmission from said source.

30. The apparatus of claim 27 including said camera and said means is carried by the camera.

31. The apparatus of claim 30 including a film pack in the camera, and graphics associated with said pack, the graphics being in the path of light transmission from said source.

32. The apparatus of clam 27 wherein said a) means includes a solid body extending about said zone, but not in said zone.

* * * * *